United States Patent
Min et al.

(10) Patent No.: US 9,969,298 B2
(45) Date of Patent: May 15, 2018

(54) CHARGER OF LOW VOLTAGE BATTERY AND METHOD THEREOF

(71) Applicant: Hyundai Motor Company, Seoul (KR)

(72) Inventors: Boung Ho Min, Gyeonggi-do (KR); Kyuil Lee, Gyeonggi-do (KR); Sung Gone Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 261 days.

(21) Appl. No.: 14/823,631

(22) Filed: Aug. 11, 2015

(65) Prior Publication Data

US 2016/0229310 A1    Aug. 11, 2016

(30) Foreign Application Priority Data

Feb. 9, 2015  (KR) .................. 10-2015-0019451

(51) Int. Cl.
| | |
|---|---|
| *H02J 7/00* | (2006.01) |
| *B60L 11/18* | (2006.01) |
| *H02J 7/34* | (2006.01) |
| *H02J 1/00* | (2006.01) |

(52) U.S. Cl.
CPC ....... *B60L 11/1887* (2013.01); *B60L 11/1892* (2013.01); *H02J 7/34* (2013.01); *H02J 2001/004* (2013.01); *H02J 2001/008* (2013.01)

(58) Field of Classification Search
USPC ................................................ 320/100–106
See application file for complete search history.

(56) References Cited

U.S. PATENT DOCUMENTS

| | | | | |
|---|---|---|---|---|
| 8,603,687 | B2 * | 12/2013 | Hamada | B60L 1/003 307/18 |
| 2008/0116843 | A1 * | 5/2008 | Kim | H01M 8/04559 320/101 |
| 2012/0326516 | A1 * | 12/2012 | Gurunathan | H02J 1/00 307/72 |

FOREIGN PATENT DOCUMENTS

| | | |
|---|---|---|
| CN | 101558524 A | 10/2009 |
| JP | 08-223705 A | 8/1996 |
| JP | 08-331772 A | 12/1996 |
| JP | 2001-298805 A | 10/2001 |
| JP | 2007-126145 A | 5/2007 |
| JP | 2013-004388 A | 1/2013 |
| JP | 2014-232609 A | 12/2014 |
| KR | 10-2009-0027504 A | 3/2009 |
| KR | 10-2012-0060265 A | 6/2012 |
| KR | 10-1439059 B1 | 11/2014 |

* cited by examiner

*Primary Examiner* — Binh Tat
(74) *Attorney, Agent, or Firm* — Mintz Levin Cohn Ferris Glovsky and Popeo, P.C.; Peter F. Corless

(57) ABSTRACT

A low voltage battery charger is provided that includes a fuel cell stack that generates electrical energy by a reaction of hydrogen and oxygen and an air blower that supplies air to the fuel cell stack. A high voltage DC converter converts an output voltage generated at the fuel cell stack to a high voltage. A high voltage battery is charged with the output voltage converted by the high voltage DC converter. A low voltage DC converter converts the output voltage generated at the fuel cell stack to a low voltage and a low voltage battery is charged with the output voltage converted by the low voltage DC converter. A controller then variably adjusts a charge voltage of the low voltage battery based on an air amount supplied to the fuel cell stack through the air blower.

6 Claims, 4 Drawing Sheets

CHARGER OF LOW VOLTAGE BATTERY AND METHOD THEREOF

CROSS-REFERENCE TO RELATED APPLICATION

This application claims priority to and the benefit of Korean Patent Application No. 10-2015-0019451 filed in the Korean Intellectual Property Office on Feb. 9, 2015, the entire contents of which are incorporated herein by reference.

BACKGROUND (a) Field of the Invention

The present invention relates to a charger of a low voltage battery and a method thereof. More particularly, the present invention relates to a charger of a low voltage battery and a method thereof that can control a charge voltage of the low voltage battery based on an air amount supplied to the fuel cell, and improve fuel consumption and durability of the fuel cell.

(b) Description of the Related Art

A fuel cell system that is applied to a hydrogen fuel cell vehicle, a type of environment-friendly vehicle, includes a fuel cell stack that generates electrical energy with an electrochemical reaction of a reaction gas, a hydrogen supply device that supplies hydrogen, which is a fuel, to the fuel cell stack, an air supply device that supplies air including oxygen, which is an oxidizing agent necessary for an electrochemical reaction, to the fuel cell stack, a heat and water management system that optimally adjusts an operation temperature of the fuel cell stack by discharging heat, which is a by-product of an electrochemical reaction of the fuel cell stack, to the exterior and that performs a water management function, and a fuel cell system controller that operates the fuel cell system.

In a vehicle in which such a fuel cell system is mounted, when using a fuel cell as a power source, the fuel cell is responsible for the loads of constituent elements of the vehicle, and thus in an operating area in which efficiency of the fuel cell is low, performance may deteriorate. Further, when a sudden load is applied to the vehicle, power may not be fully supplied to a driving motor and thus performance of the vehicle may deteriorate due to the generation of electricity by a chemical reaction causing a sudden load change to the fuel cell.

Further, since the fuel cell has one direction output characteristics, when no separate power storage is present and the vehicle brakes, energy that flows from a driving motor may not be recovered and thus efficiency of a vehicle system may deteriorate. Therefore, as a method of overcoming the drawbacks, a fuel cell hybrid vehicle has been developed. The fuel cell hybrid vehicle is a system that mounts a power storage, for example, a super capacitor or a high voltage battery as a separate auxiliary power source for providing power necessary for driving a load, such as a driving motor in addition to a fuel cell, which is a major power source in a vehicle.

In a fuel cell-battery hybrid vehicle, a fuel cell that is used as a major power source and a high voltage battery that is used as an auxiliary power source may be coupled in parallel, and the high voltage battery (e.g., a main battery) and a low voltage battery (e.g., a 12 V auxiliary battery) for driving low voltage driving components of the vehicle are mounted, i.e., a high voltage battery and a low voltage battery, which are two types of batteries, may be mounted together.

Meanwhile, the fuel cell is configured to generate electrical energy by reaction of hydrogen and oxygen, and the electrical energy amount generated at the fuel cell stack is proportional to hydrogen amount supplied to the fuel cell stack. The hydrogen amount supplied to the fuel cell stack is determined based on an air amount supplied to the fuel cell stack. Therefore, techniques for minimizing hydrogen used in the fuel cell stack and improving fuel consumption by varying a charge voltage of the low voltage battery that charges electrical energy generated at the fuel cell stack are required.

The above information disclosed in this section is merely for enhancement of understanding of the background of the invention and therefore it may contain information that does not form the prior art that is already known in this country to a person of ordinary skill in the art.

SUMMARY

The present invention provides a charger of a low voltage battery and a method thereof that minimize hydrogen use in a fuel cell stack and improve fuel consumption of a vehicle by varying a charge voltage of the low voltage battery. Further, the present invention provides a charger of a low voltage battery and a method thereof that improve durability of the fuel cell stack by preventing a high voltage from being formed at the fuel cell stack when an air amount supplied to the fuel cell stack is minimal.

A low voltage battery charger according to an exemplary embodiment of the present invention may include: a fuel cell stack configured to generate electrical energy by a reaction of hydrogen and oxygen; an air blower configured to supply air to the fuel cell stack; a high voltage direct-current (DC) converter configured to convert an output voltage generated at the fuel cell stack to a high voltage; a high voltage battery charged with the output voltage converted by the high voltage DC converter; a low voltage DC converter configured to convert the output voltage generated at the fuel cell stack to a low voltage; a low voltage battery charged with the output voltage converted by the low voltage DC converter; and a controller configured to variably adjust a charge voltage of the low voltage battery based on an air amount supplied to the fuel cell stack through the air blower.

The controller may be configured to divide the air amount supplied to the fuel cell stack through the air blower into N air amounts between a minimal air amount and a maximal air amount, and may be configured to charge the low voltage battery based on N charge voltages that correspond to the N air amounts. The charge voltage of the low voltage battery that corresponds to the minimal air amount may be set to a maximal charge voltage. The charge voltage of the low voltage battery that corresponds to the maximal air amount may be set to a minimal charge voltage. The N charge voltages may be decreased step by step (e.g., incrementally, gradually, etc.) between the maximal charge voltage and the minimal charge voltage. The controller may further be configured to charge the low voltage battery based on an emergency charge voltage when an emergency operation of the low voltage battery is required.

A charge method of a low voltage battery according to another exemplary embodiment of the present invention may include: calculating an air amount supplied to a fuel cell stack based on required power of the fuel cell stack; determining the charge voltage of the low voltage battery that corresponds to the air amount; and variably charging the low voltage battery based on the charge voltage. The air amount may be divided into N air amounts between a minimal air amount and a maximal air amount based on required power of the fuel cell stack, and the charge voltage may be set to N charge voltages that correspond to the N air amounts. The charge voltage that corresponds to the minimal air amount may be set to the maximal charge voltage. The charge voltage that corresponds to the maximal air amount may be set to the minimal charge voltage. The N charge voltages may be decreased step by step between the maximal charge voltage and the minimal charge voltage.

The charge method of a low voltage battery may further include determining whether an emergency operation of the low voltage battery is required when the air amount is the maximal air amount, wherein the low voltage battery may be charged by the emergency charge voltage when the emergency operation of the low voltage battery is required. The charge method of a low voltage battery may further include determining whether an emergency operation of the low voltage battery is required when the air amount is the minimal air amount, wherein the low voltage battery may be charged by the emergency charge voltage when the emergency operation of the low voltage battery is required.

According to an exemplary embodiment of the present invention, since the charge voltage of the low voltage battery may be variably adjusted based on the air amount supplied to the fuel cell stack, hydrogen amount use in the fuel cell stack may be minimized thus it may be possible to improve fuel consumption of the vehicle. Further, since the charge voltage of the low voltage battery may be variably adjusted based on the air amount supplied to the fuel cell stack, a high voltage formed at the fuel cell stack may be prevented and it may be possible to improve durability of the fuel cell stack.

BRIEF DESCRIPTION OF THE DRAWINGS

The drawings are for reference in describing an exemplary embodiment of the present invention, so that it shall not be construed that the technical spirit of the present invention is limited to the accompanying drawings.

DETAILED DESCRIPTION

Figure 1:
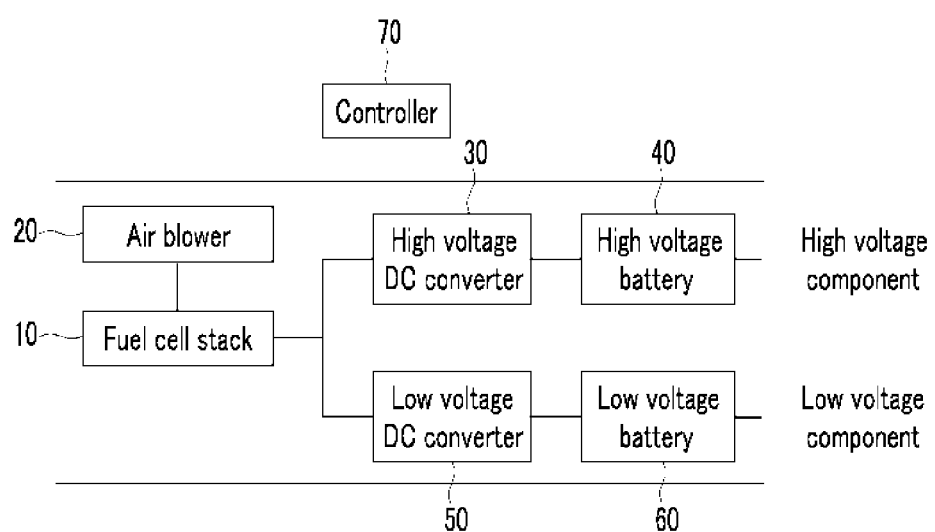
FIG. 1 is a block diagram illustrating a low voltage battery charger according to an exemplary embodiment of the present invention.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to clearly describe the present invention, portions that are not connected with the description will be omitted. Like reference numerals designate like elements throughout the specification. In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, a low voltage battery charger according to an exemplary embodiment of the present invention will be described in detail with reference to accompanying drawings.

FIG. 1 is a block diagram illustrating a low voltage battery charger according to an exemplary embodiment of the present invention. As shown in FIG. 1, a low voltage battery charger according to an exemplary embodiment of the present invention may include a fuel cell having a plurality of fuel cell stacks 10, an air blower 20 configured to supply air to the fuel cell stack 10, a high voltage DC converter 30 configured to convert an output voltage generated at the fuel cell stack 10, a high voltage battery 40 charged with the output voltage converted by the high voltage DC converter 30, a low voltage DC converter 50 configured to convert the output voltage of the high voltage battery 40, a low voltage battery 60 charged with the output voltage converted by the low voltage DC converter 50, and a controller 70 configured to operate the fuel cell, the air blower 20, the high voltage DC converter 30, the high voltage battery 40, the low voltage DC converter 50, and the low voltage battery 60.

The fuel cell stack 10 may be configured to generate electrical energy by a reaction of hydrogen and oxygen. A configuration of the fuel cell stack 10 is well known to those skilled in the art and thus a detailed description will not be provided herein. Further, the air blower 20 may be configured to supply a reaction gas of hydrogen and air to the fuel cell stack 10.

The high voltage DC converter 30 may be configured to convert electrical energy generated at the fuel cell stack 10 to high voltage DC power, and the high voltage DC power converted using the high voltage DC converter 30 may be charged in the high voltage battery 40. The high voltage DC power charged in the high voltage battery 40 may be supplied to high voltage components such as a drive motor and the air blower 20 of a vehicle. Herein, the high voltage means a voltage greater than about 100 V, for example, 150 V, 300 V, 450 V, or 650 V.

The low voltage DC converter 50 may be configured to convert electrical energy generated at the fuel cell stack 10 to low voltage DC power, and the low voltage DC power converted using the low voltage DC converter 50 may be charged in the low voltage battery 60. The low voltage DC power charged in the low voltage battery 60 may be supplied to low voltage components such as a navigation device or an audio device. Herein, the low voltage means a voltage less than about 100 V, for example, 12 V, 24 V, or 48 V.

The controller 70 may be implemented by one or more processors operated by a predetermined program, in which the predetermined program is set to perform steps of the charge method of a low voltage battery according to an exemplary embodiment of the present invention. Particularly, the controller 70 may be configured to adjust an air amount supplied to the fuel cell stack 10 through the air blower 20 based on required power of the fuel cell stack 10, and adjust a charge voltage of the low voltage battery 60 through the air amount.

Figure 2:
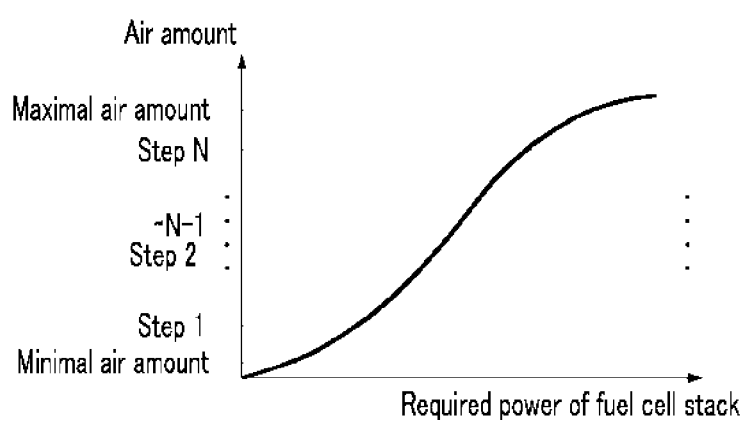
FIG. 2 is a graph illustrating a relationship between required power and an air amount of a fuel cell stack according to an exemplary embodiment of the present invention.
Figure 3:
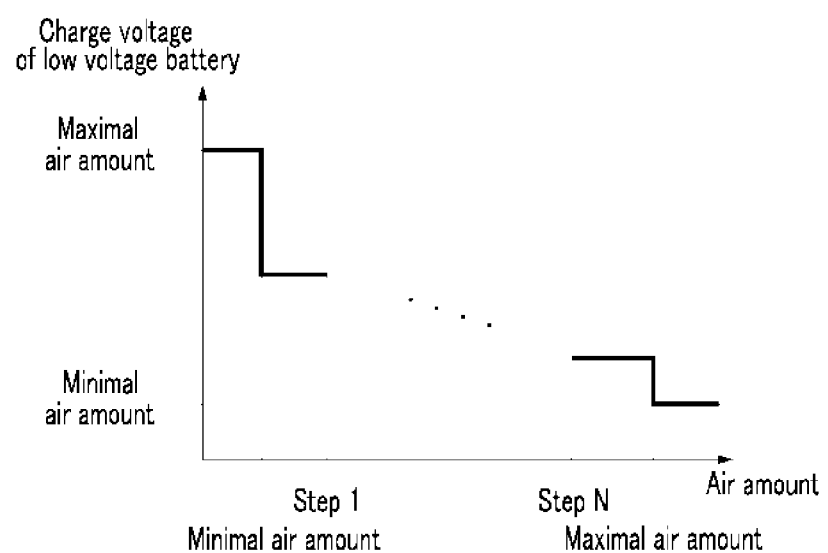
FIG. 3 is a graph illustrating a relationship between an air amount and a charge voltage of a low voltage battery according to an exemplary embodiment of the present invention.

Hereinafter, the charge method of the low voltage battery 60 using the air amount will be described in detail. FIG. 2 is a graph illustrating a relationship between required power and an air amount of a fuel cell stack according to an exemplary embodiment of the present invention. In FIG. 2, the x axis shows required power of the fuel cell stack, and the y axis shows the air amount supplied to the fuel cell stack. FIG. 3 is a graph illustrating a relationship between an air amount and a charge voltage of a low voltage battery according to an exemplary embodiment of the present invention. In FIG. 3, the x axis shows the air amount, and the y axis shows a charge voltage of the low voltage battery.

As shown in FIG. 2, the air amount according to the required power of the fuel cell stack 10 is similar to a hysteresis curve. The controller 70 may be configured to divide the air amount supplied to the fuel cell stack 10 into N air amounts between a minimal air amount and a maximal air amount. FIG. 3 shows a charge voltage of the low voltage battery 60 that corresponds to the N air amounts supplied to the fuel cell stack 10. The charge voltage of the low voltage battery 60 that corresponds to the minimal air amount may be set to a maximal charge voltage, and the charge voltage of the low voltage battery 60 that corresponds to the maximal air amount may be set to a minimal charge voltage. The N charge voltages may be decreased step by step (e.g., incrementally) between the maximal charge voltage and the minimal charge voltage.

Meanwhile, when an emergency operation of the low voltage battery 60 is required, the controller 70 may be configured to charge the low voltage battery 60 based on a predetermined emergency charge voltage. The emergency operation may be when the fuel cell stack 10 or the high voltage battery 40 is out of order (e.g., an error occurs or a failure is detected). In particular, the emergency charge voltage may be set to a maximal charge voltage capable of charging the low voltage battery 60.

Hereinafter, a charge method of the low voltage battery according to an exemplary embodiment of the present invention will be described in detail with reference to accompanying drawings.

Figure 4:
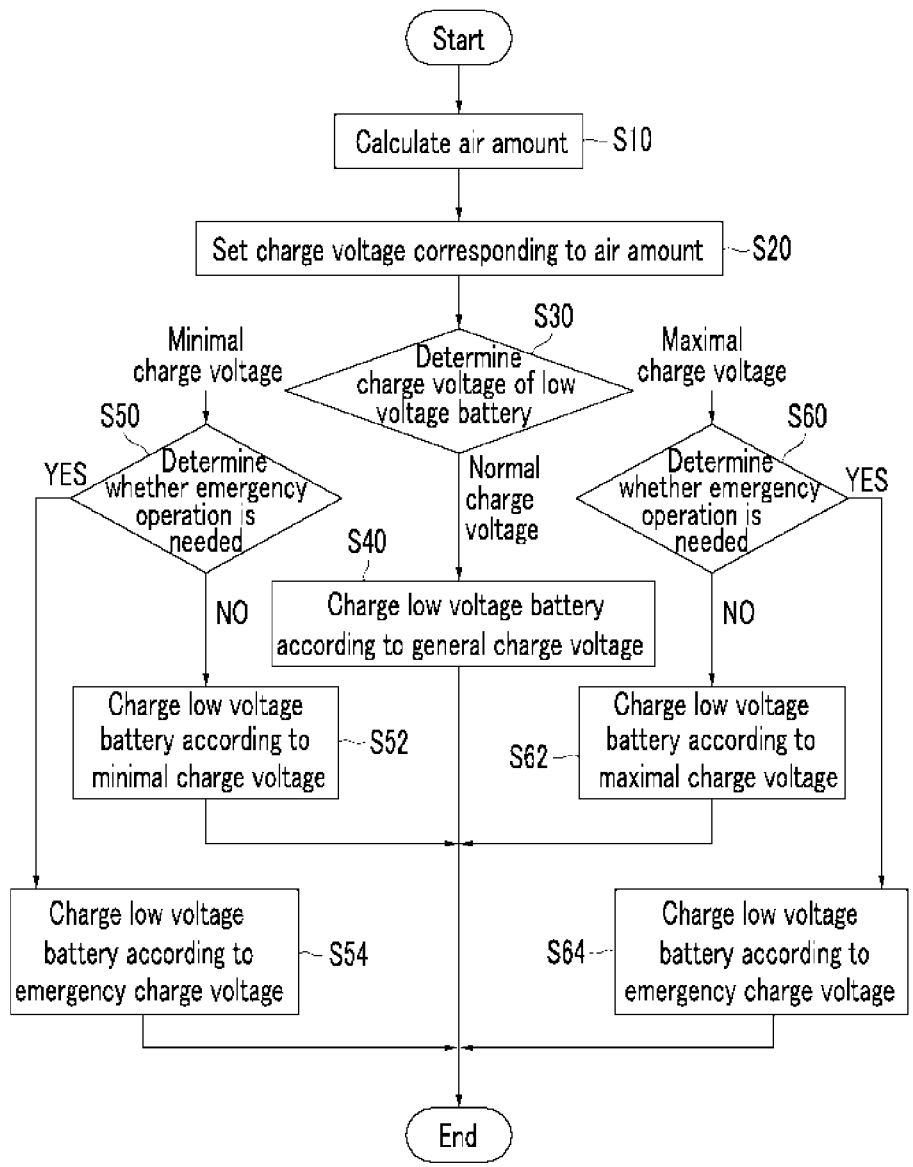
FIG. 4 is a flowchart illustrating a charge method of a low voltage battery according to an exemplary embodiment of the present invention.

FIG. 4 is a flowchart illustrating a charge method of a low voltage battery according to an exemplary embodiment of the present invention. As shown in FIG. 4, the controller 70 may be configured to calculate the air amount supplied to the fuel cell stack 10 through the air blower 20 based on the required power of the fuel cell stack 10 at step S10.

The controller 70 may then be configured to set a charge voltage that corresponds to the air amount of the low voltage battery 60 at step S20. The air amount supplied to the fuel cell stack 10 may be divided into N air amounts based on the required power of the fuel cell stack 10 between the minimal air amount and the maximal air amount, and the charge voltage of the low voltage battery 60 may be set corresponding to N charge voltages corresponding to the N air amounts. The N charge voltages may be set to be decreased step by step between the maximal charge voltage and the minimal charge voltage. The charge voltage that corresponds to the minimal air amount may be set to a maximal charge voltage, and the charge voltage that corresponds to the maximal air amount may be set to a minimal charge voltage. For convenience of description, the N charge voltages between the maximal charge voltage and the minimal charge voltage may be referred to as general charge voltages.

The controller 70 may further be configured to determine the charge voltage of the low voltage battery 60 based on the air amount at step S30. When the charge voltage is the general charge voltage between the minimal charge voltage and the maximal charge, the controller 70 may be configured to charge the low voltage battery 60 based on a predetermined general charge voltage at step S40. When the charge voltage is the minimal charge voltage, the controller 70 may be configured to determine whether the emergency operation of the low voltage battery 60 is required at step S50.

When the emergency operation of the low voltage battery 60 is required, the controller 70 may be configured to charge the low voltage battery 60 based on the predetermined emergency charge voltage at step S54. However, when the emergency operation of the low voltage battery 60 is not required, the controller 70 may be configured to charge the low voltage battery 60 based on the minimal charge voltage at step S52. In the step S30, when the charge voltage of the low voltage battery 60 is the maximal charge voltage, the controller 70 may be configured to determine whether the emergency operation of the low voltage battery 60 is required at step S60.

When the emergency operation of the low voltage battery 60 is required, the controller 70 may be configured to charge the low voltage battery 60 based on the predetermined emergency charge voltage at step S64. However, when the emergency operation of the low voltage battery 60 is not required, the controller 70 may be configured to charge the low voltage battery 60 based on the minimal charge voltage at step S62. Accordingly, the emergency operation may be determined when the charge voltage is the minimal charge voltage or the maximal charge voltage, since the charge voltage of the low voltage battery 60 may be normally adjusted when the charge voltage is the general charge voltage (e.g., when no failure occurs).

As described above, according to an exemplary embodiment of the present invention, the charge voltage of the low voltage battery 60 may be decreased when the air amount supplied to the fuel cell stack 10 is increased, and thus it may be possible to improve fuel consumption of the vehicle. Additionally, the charge voltage of the low voltage battery 60 may be increased when the air amount supplied to the fuel cell stack 10 is decreased, and thus a high voltage formed at the fuel cell stack 10 may be prevented. Therefore, it may be possible to improve durability of the fuel cell stack 10.

DESCRIPTION OF SYMBOLS

10: fuel cell stack
20: air blower
30: high voltage DC converter
40: high voltage battery
50: low voltage DC converter
60: low voltage battery
70: controller While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A low voltage battery charger, comprising:
    a fuel cell stack configured to generate electrical energy by a reaction of hydrogen and oxygen;
    an air blower configured to supply air to the fuel cell stack;
    a high voltage direct-current (DC) converter configured to convert an output voltage generated at the fuel cell stack to a high voltage;
    a high voltage battery charged with the output voltage converted by the high voltage DC converter,
    a low voltage DC converter configured to convert the output voltage generated at the fuel cell stack to a low voltage;
    a low voltage battery charged with the output voltage converted by the low voltage DC converter and a controller configured to variably adjust a charge voltage of the low voltage battery based on an air amount supplied to the fuel cell stack through the air blower,
    wherein the controller is configured to divide the air amount supplied to the fuel cell stack through the air blower into N air amounts between a minimal air amount and a maximal air amount, and charge the low voltage battery based on N charge voltages that correspond to the N air amounts.

2. The low voltage battery charger of claim 1, wherein the charge voltage of the low voltage battery that corresponds to the minimal air amount is set to a maximal charge voltage.

3. The low voltage battery charger of claim 1, wherein the charge voltage of the low voltage battery that corresponds to the maximal air amount is set to a minimal charge voltage.

4. The low voltage battery charger of claim 2 wherein the N charge voltages are decreased incrementally between the maximal charge voltage and the minimal charge voltage.

5. The low voltage battery charger of claim 3, wherein the N charge voltages are decreased incrementally between the maximal charge voltage and the minimal charge voltage.

6. The low voltage battery charger of claim 1, wherein the controller is configured to charge the low voltage battery based on an emergency charge voltage when an emergency operation of the low voltage battery is required.

* * * * *